United States Patent
Rayman

(10) Patent No.: US 6,478,387 B1
(45) Date of Patent: Nov. 12, 2002

(54) HEAVY DUTY DUAL TIRE ASSEMBLY

(75) Inventor: William Earl Rayman, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/904,996

(22) Filed: Jul. 13, 2001

(51) Int. Cl.$^7$ ............................................. B62D 55/07
(52) U.S. Cl. ........................ 305/19; 305/185; 301/36.3
(58) Field of Search ................. 152/185.1; 301/36.3; 305/6, 7, 19, 165, 166, 184, 185, 40

(56) References Cited

U.S. PATENT DOCUMENTS

| | | | | |
|---|---|---|---|---|
| 1,986,865 A | * | 1/1935 | Tschappat | 305/184 |
| 2,195,487 A | * | 4/1940 | Higbee | 301/36.3 |
| 2,898,965 A | * | 8/1959 | Eddy | 305/184 |
| 3,276,823 A | * | 10/1966 | Tucker, Jr. | 305/184 |
| 3,435,873 A | * | 4/1969 | Weier | 305/165 |
| 3,533,663 A | * | 10/1970 | Planalto | 152/185.1 |
| 3,578,052 A | * | 5/1971 | Petersons | 305/19 |
| 3,630,580 A | * | 12/1971 | Grawey | 305/185.1 |
| 3,776,291 A | * | 12/1973 | Boggs | 305/185.1 |
| 4,351,380 A | | 9/1982 | Pilliod, Jr. et al. | 152/169 |
| 4,480,670 A | * | 11/1984 | Payne | 305/185.1 |
| 4,787,679 A | * | 11/1988 | Arnold | 301/36.3 |
| 6,296,328 B1 | * | 10/2001 | Wilkinson | 305/165 |

FOREIGN PATENT DOCUMENTS

JP         596918 A * 5/1993 ................. 305/165

* cited by examiner

*Primary Examiner*—S. Joseph Morano
*Assistant Examiner*—Long Bao Nguyen
(74) *Attorney, Agent, or Firm*—David L. King

(57) ABSTRACT

A heavy duty dual tire assembly (10) for mounting on dual rims (2) is disclosed. The assembly has a pair of tires (14) and a pair of separate removable annular tread belts (12) for mounting over both tires (14) the pair of separate removable annual tread belts (12) bridge the gap between the tires (10) when they are laterally adjacent and coaxially aligned by mounting on a dual rim. In one embodiment there is a separated tread belt spacer (9) that is interposed between tread belts (12) to, in combination with the tread belts, bridge the gap between the tires.

10 Claims, 13 Drawing Sheets

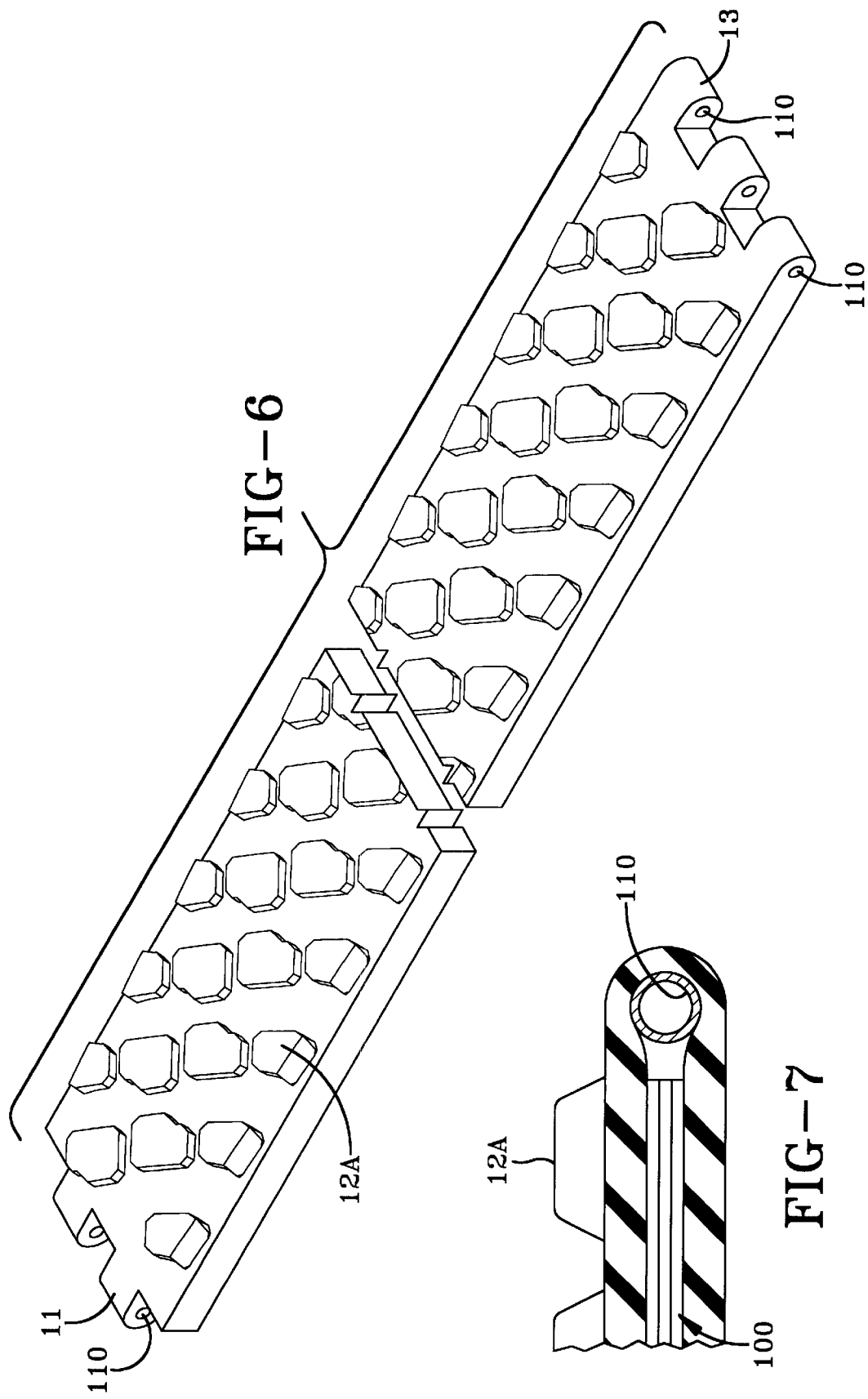

HEAVY DUTY DUAL TIRE ASSEMBLY

RELATED APPLICATIONS

This patent application is related to a patent application entitled "A Three Piece Tire Assembly" filed on May 31, 2001, having U.S. Ser. No. 09/871025, which is incorporated herein by reference in its entirety.

TECHNICAL FIELD

The invention relates to a three piece tire with a removable tread belt mounted on a reinforced tire carcass. One use of the invention is typically for use with earthmoving vehicles, others include any application where dual wheel assemblies are commonly employed.

BACKGROUND OF THE INVENTION

The heavy duty tire assembly of the present invention is generally designed for use on earthmover vehicles and are subjected to high stress and loads under harsh environmental conditions such as in rock quarries, mines, foundries, and other areas where tires are subjected to puncture-producing and wear-inducing conditions.

As discussed in U.S. Pat. No. 4,351,380, certain prior art tread belt tire assemblies comprise a plurality of ground engaging shoes spaced about the periphery of the supporting structure. The heavy loads on the shoes result in great stresses being developed that sometimes lead to premature tire failure. The U.S. Pat. No. 4,351,380 patent is directed to an improved track belt assembly which comprise a plurality of shoes spaced about the periphery of a load-supporting structure and secured to a reinforcing belt structure disposed on the side of the shoe opposite the ground-engaging side thereof The large pneumatic tires, which are typically used for earthmoving vehicles, sometimes fail due to the high stress and loads caused by the harsh environmental conditions in which they are operated. These large prior art pneumatic tires had a greater tendency to fail in the crown or shoulder area of the tire due to excessive heat build up.

In the prior art, conventional solutions to these problems include increasing the robustness, and decreasing the tire deformation under load by increasing the sidewall stiffness. To further improve tire durability, the ply turn-up portion of these tires was typically reinforced.

With the continual drive to improve earthmover performance to severe continuous service conditions requiring 20 hours and up of service per day, seven days a week, there is a continuing need to provide novel methods and tire designs for improving earthmover tire durability. The present invention is directed to an improved pneumatic tire carcass and removable tread belt assembly with which the frequency of premature tire failure is thought to be substantially reduced. The present invention is also directed to providing an improved heavy duty dual tire assembly, which is designed to operate at long hours without damaging heat buildup. Moreover, the present invention relates to improved heavy duty dual pneumatic tires wherein a pair of removable tread belts and the tires can form an assembly which can replace conventional dual tires on any dual axle assembly including trucks, tractors, light truck vehicles, and trailers.

SUMMARY OF THE INVENTION

A heavy duty dual tire assembly has a pair of tires and two removable tread belts. The two tread belts encircle both tires. The pair of tires are coaxially aligned when mounted on rims. The rims preferably are laterally spaced dual rims commonly found on trucks and heavy earthmoving type vehicles. The rims are rigidly attached to an axle in normal use when the tires are mounted. The tires are preferably radially expandable. The tires of one embodiment of the invention are pneumatic. The tires can be provided without a ground engaging tread and without a belt reinforcing structure. Preferably the tires have at least one carcass ply. The removable tread belt is preferably a circular elastomeric cord reinforced ring. Alternatively, the removable tread belt can be made as a flat track having ends. The ends, when joined, form a circular elastomeric cord reinforced ring. The tread belt has an inner surface, the inner surface has one or more radially inwardly projecting restraining elements laterally in contact with at least one tire.

The tires have the one or more restraining elements being a single rib or a plurality of ribs or circumferentially aligned lugs positioned between the tread belt and the two tires. In another embodiment the one or more restraining elements is a plurality of grooves and tread elements wherein one or both of the tires has a circumferentially outer surface tread having tread elements and grooves that interlock with complimentary restraining elements of the tread belt.

In another embodiment, the tread belts have lateral facing surfaces abutting an annular tread belt spacer as a separate component positioned between the two tread belts and projecting into a gap or space between the dual tires.

The removable cord reinforced elastomeric tread belt has a radially outer tread, a belt reinforcing structure radially inward of the tread, and a radially inner surface wherein the radially inner surface has a lateral width sufficient to encircle a tire for normal dual wheel axles. The radially inner surfaces of the tread belts have one or more restraining elements to prevent the tread belts from slipping off the tires when mounted.

Definitions

"Apex" means a non-reinforced elastomer positioned radially above a bead core.

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tie comprising an annular tensile member wrapped by the ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17° to 75° with respect to the equatorial plane of the tire.

"Bias ply tire" means a tire having a carcass with reinforcing cords in the carcass ply extending diagonally across the tire from bead core to bead core at about 25°–50° angle with respect to the equatorial plane of the tire. Cords run at opposite angles in alternate layers.

"Circumferential" means lines or directions extending along the perimeter of the surface of the annular tread perpendicular to the axial direction.

"Chafers" refers to narrow strips of material placed around the outside of the bead to protect cord plies from degradation and chaffing caused by movement of the rim against the tire.

"Chippers" means a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact o the tire tread with a flat surface under load and pressure.

"Inner line" means the layer or layers of elastomer or other material that form the inside surface of a tubeless tire and that contain the inflating gas or fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the diameter of the rim base at the location where the bead of the tire seals.

"Normal inflation pressure" refers to the specific design inflation pressure at a specific load assigned by the appropriate standards organization for the service condition for the tire.

"Normal load" refers to the specific load at a specific design inflation pressure assigned by the appropriate standards organization for the service condition for the tire.

"Ply" means a continuous layer of rubber-coated parallel cords.

"Radial" and "radially" mean directions extending radially toward or away from the axis of rotation of the tire.

"Radial-ply tire" means a pneumatic tire in which the ply cords, which extend from bead to bead are laid at cord angles between 65° and 90° with respect to the equatorial plane of the tire.

"Section height (SH)" means the radial distance from the nominal rim diameter to the outer diameter of the tire at its equatorial plane.

BRIEF DESCRIPTION OF THE DRAWINGS

FIG. 6 is a perspective view of the removable tread belt formed as a flat track.

FIG. 7 is an enlarged cross-sectional view of ends of the tread belt of FIG. 6.

DETAILED DESCRIPTION OF THE INVENTION

Figure 1:
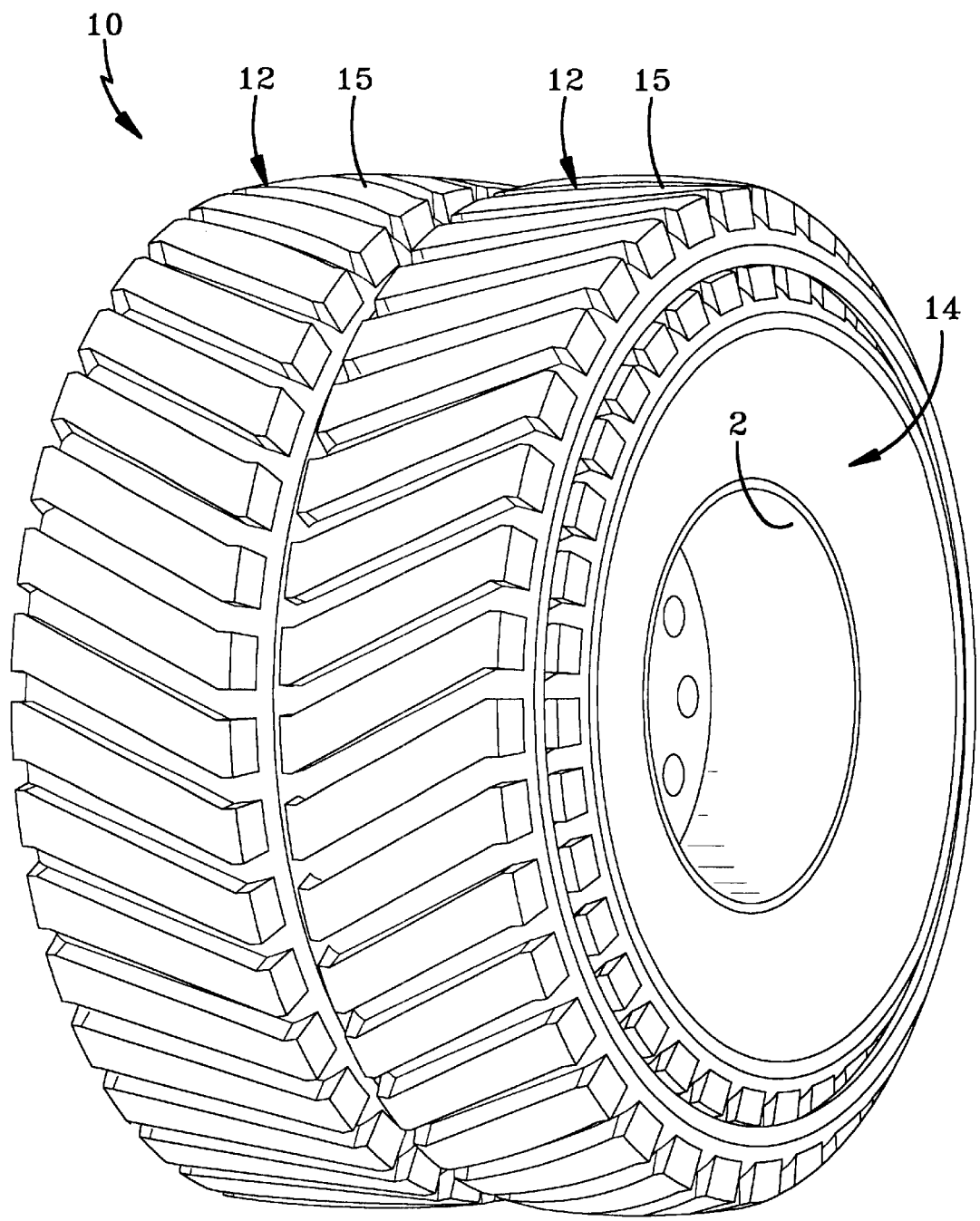
FIG. 1 is a perspective view of the removable tread belt mounted on a pair of tires mounted on a dual rim assembly.

With reference to FIG. 1, there is illustrated a view of a four piece tire assembly 10 which in the specific exemplary embodiment illustrated is a size equivalent to a pair of 33.00R51 earthmover tires. At an inflation pressure of 102 psi the tire has a 119.9 inch (303 cm) maximum inflated outside diameter, a 37.2 inch (94cm) maximum inflated width tire in the axial directions, and a nominal bead diameter of 51,00 inches (130 cm). The tires are typically inflated to a pressure of about 100 pounds per square inch (psi) with air and sometimes with an air/nitrogen mixture.

As illustrated in FIGS. 1, 8, 9 and 10, the improved heavy duty tire assembly 10 includes a pair of ground engaging, circumferentially extending tread belts 12 mounted on a pair of radially reinforced, beaded tires 14. The beaded tire 14 generally includes a pair of tire sidewalls 16, 18 extending radially inwardly from the outer circumferential surface 20 of the tire and terminating at their radial extremities in a pair of bead wires 22, 24 respectively, and radially inward of the maximum section width of the tire 14. The details of the construction of tire 14 are described in detail hereinafter.

Tire

Figure 8:
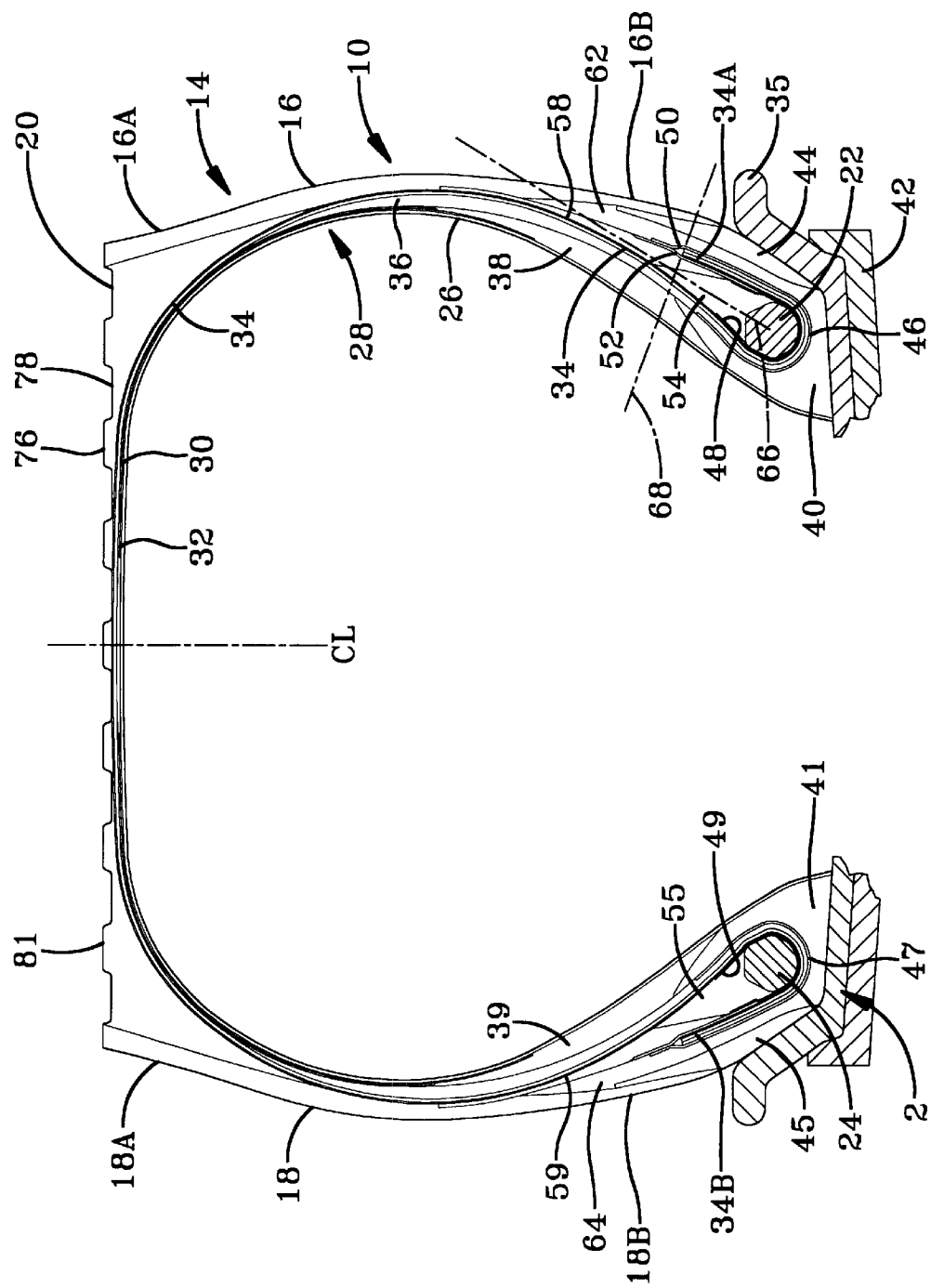
FIG. 8 is a cross-sectional view of the tire of FIG. 1.

Referring to FIG. 8, the details of tire 14 are illustrated. The axially inward surface 28 is an inner ply liner 26, which forms an inner liner that holds the air pressure for inflating tire 10. The inner ply liner 26 covers the entire interior facing surface 28 of the tire 14 and serves to hold the air within the tire that is used to inflate the tire 10. Fabric barrier plies 30 and 32 are provided within the tire in the area of the curved portion of interior surface 28 to provide support for the upper portion of the barrier rubber layer 36 and prevent the barrier rubber from being squeezed through the ply wires in the ply layer 34. While two barrier plies 30 and 32 are illustrated, it is within the terms of the invention to use between zero and four barrier plies, as needed for a specific design.

The tire 14 also includes in its construction at least one rubberized laminated ply layer 34 of tire cord fabric which extends radially inwardly form the outer circumferential surface 20 of the tire, also called the crown area of the tire carcass, and has turn up ends 34a and 34b which wrap or loop around bead wires 22 and 24, respectively. Although the carcass ply 34 is shown as being of single ply construction, a multi-ply construction can be employed if desired. Preferably, the carcass ply 34 is made of a rubberized ply of steel cord, but it can be made of a non-steel carcass reinforcing material.

Figure 3:
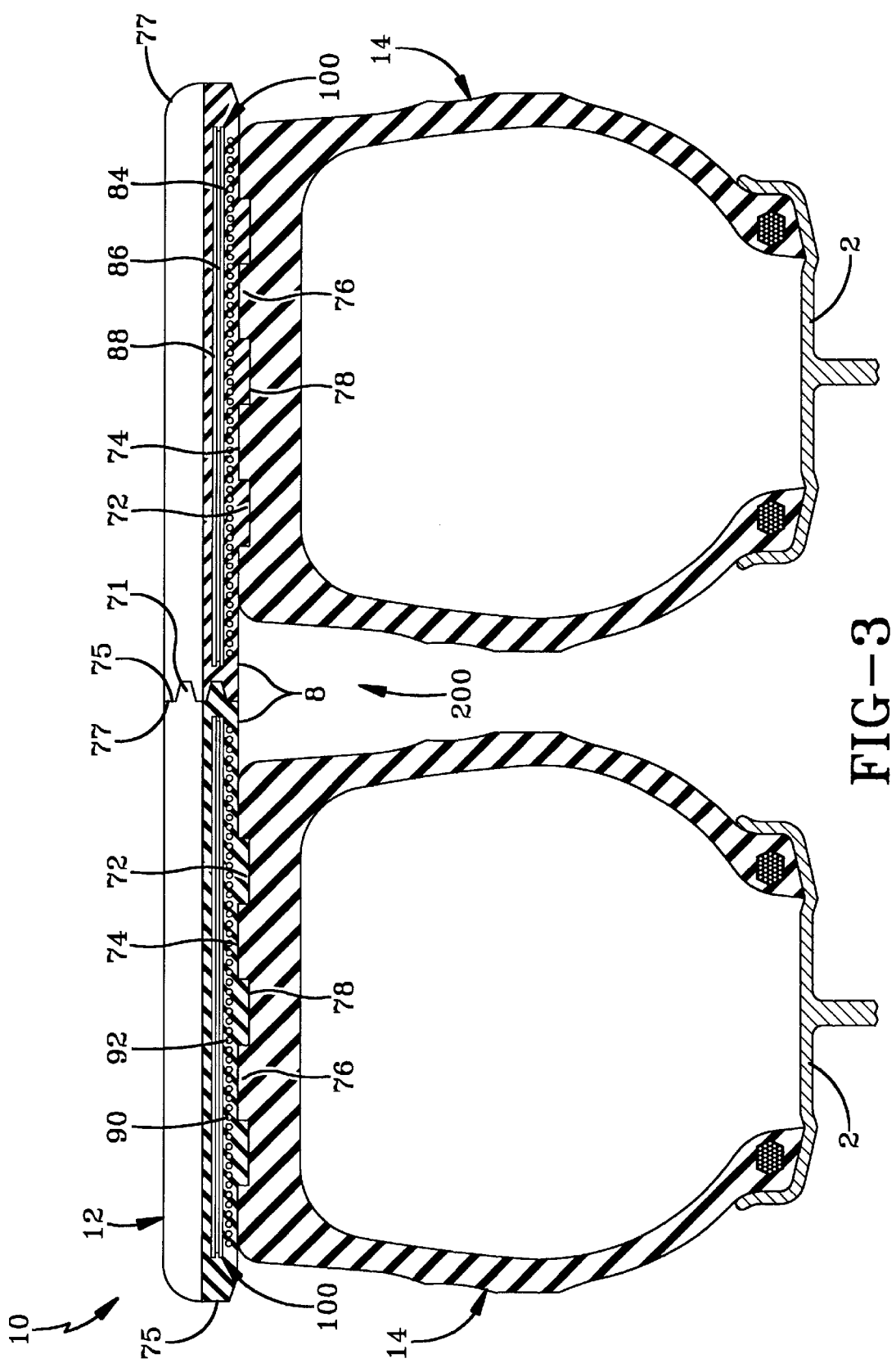
FIG. 3 is a cross-sectional view of a second embodiment of the invention.

At the radially outermost portion of the tire 14 there is a thin layer of abrasion resistant tread compound 81. The abrasion resistant tread compound 81 forms a tough durable long wearing surface between the tread belt 12 and the tire 14. The use of tread rubber is an ideal material because it is adapted to form a durable wear surface as shown in FIG. 3, ribs 76 and grooves 78, may be used to retain the tread belt 12. Preferably the tread compound 81 is identical to the rubber compound used in the tread belt 12, which is also generally a typical rubber blend used for treads.

Between the inner liner 26 and the ply layer 34 is a barrier rubber layer 36, which backs up the entire length of ply 34 and is formed of a soft compound of rubber which squeezes against the ply layer 34. Annular stiffeners, known as apexes or apes elements 38, 39 herein, each having a generally triangular shape are provided radially outward of the bead wires 22, 24 respectively, and between the barrier rubber 36 and the inner liner 26. The apexes 38, 39 extend from approximately the mid-sidewall and the area of the inner liner 26 radially outward from the bead wires 22, 24 respectively, or stiffening the bead area to help prevent the tire from bending over the flange 35. Axially outward from apexes 38, 39 and between the ply layer 34 where it turns up about bead wires 22, 24 are located lower gum chafers 40, 41 respectively, that support the bead wires 22, 24 respectively, in the area of the wheel mounting rim 42 and to prevent chafing of the tire by an adjacent wheel mounting rim. Upper gum chafers 44, 45 are disposed against the lower gum chafers 40, 41 respectively, and the lower tire sidewalls 16b, 18b respectively to provide support for the bead wires 22, 24 in the area of the flange 35 and to prevent chafing of the tire by an adjacent wheel mounting rim.

Figure 9:
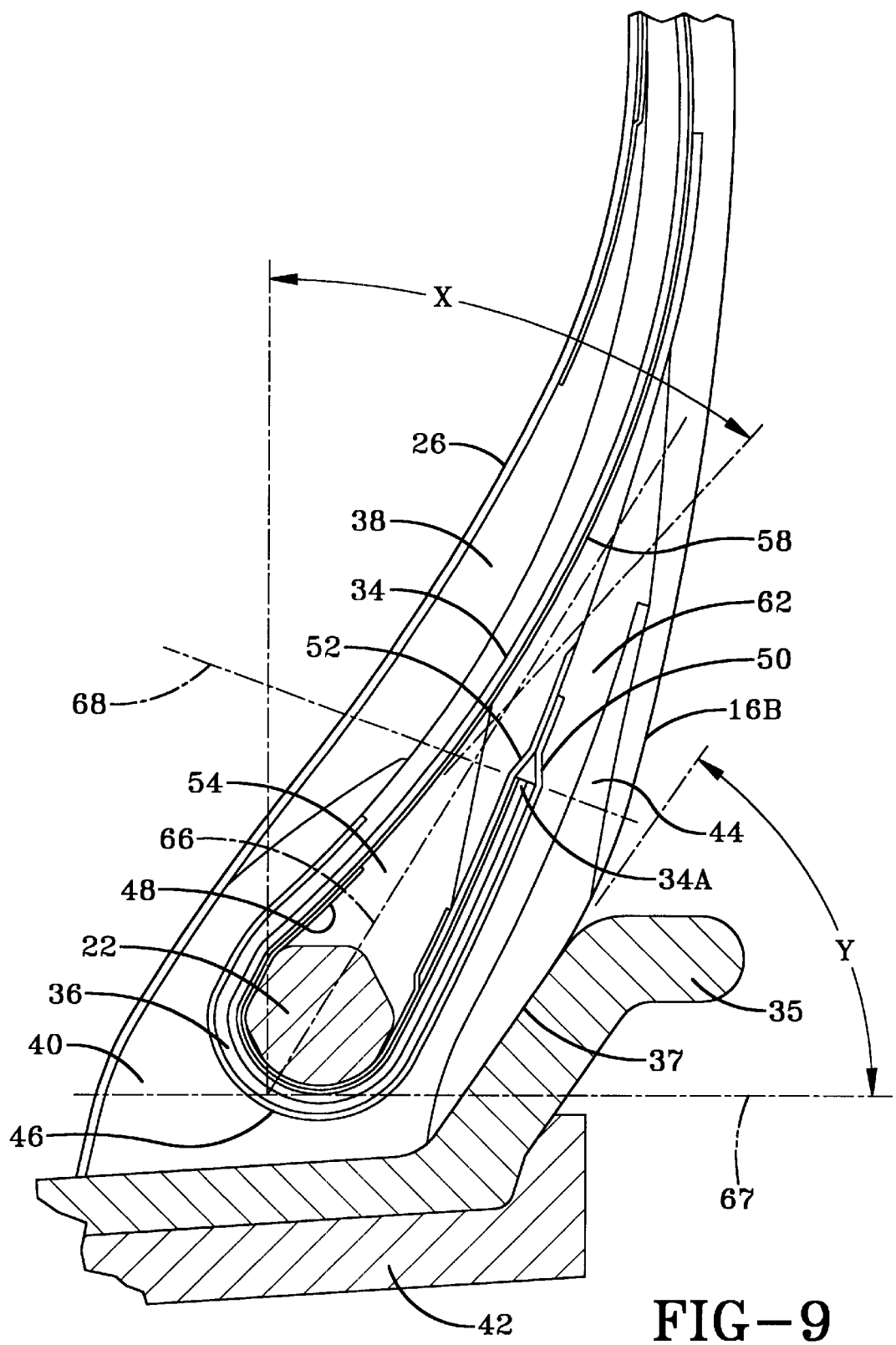
FIG. 9 is a cross-sectional view of the bead apex.

Between lower chafers 40, 41 and the rubber barrier 36 in the area partially surrounding bead wires 22, 24 are located fabric or wire chafer plies 46, 47 that support the bead wires 22, 24 respectively. As best seen in FIG. 9, the chafer plies 46 are primarily disposed against the inner facing surfaces of lower chafers 40, 41. Between the inner surface of ply layer 34 and the bead wires 22 and 24 are located flippers 48, 49 respectively, which are reinforced fabric materials that are wrapped about the bead core and at least a portion of one of the apexes. On either side of the ends 34a, 34b of ply layer 34 are two wire coat, gum layers 50 and 52 which cover the ends 34a, 34b of ply layer 34 are two wire coat, gum layers 50 and 52 which cover the ends 34a, 34b of ply 34 and enable the movement of ply 34 between the gum layers 50 and 52 without exposing the wire within ply 34 during tire construction or severe bending of the tire.

Apex Configuration

Two annular stiffeners, referred to as apexes 54, 55 herein, each having a generally four sided shape, are provided radially outward of the bead wires 22, 24 respectively, between flippers 48, 49 and out to apexes 58, 59 for stiffening the area about the bead wires 22, 24 respectively, to help prevent the tire from bending over the flange 35. The apexes 54, 55 are further disposed between the lower inner end of rubberized ply layer 34 and the turn-up ends 34a and 34b. Abutted against and extending radially outward from the apexes 54 and 55 are two annular stiffeners, referred to herein as apexes 58 and 59, respectively, which help support the ends 34a and 34b of the rubberized ply layer 34. The apexes 54, 55 are constructed of a relatively hard compound having a modulus of about 12.2–14.9 megapascals/cm² at 200% elongation. Axially outward from the apexes 58 and 59 are the outer apexes 62 and 64 respectively. The apexes 38, 39, 58, 59, and 62, 64 are generally constructed of the same relatively soft rubber compound having a modulus of about 7.2–8.8 megapascals/cm² elongation and act to provide a soft cushion that absorbs the stresses around the turn up ends 34a and 34b of the ply layers 34 which is caused by stress forces generated by the flexing of the tire. While the apexes 38, 39, 58, 59 and 62, 64 are typically constructed of the same rubber compound, it is within the terms of the invention to construct one or more of the apexes with a different modulus within the range of between about 7.2 and 8.8 megapascals/cm² at 200%. In the preferred embodiment, the apexes 38, 39, 58, 60, 62 and 64 are softer than the apexes 54 and 55, which are located directly adjacent, and radially outward form the bead wires 22 and 24, respectively. Preferably the rubber compound used to form the apexes 54 and 55 are about 20% to about 50% an preferably about 20% to about 50% stiffer than the rubber compound used to form apexes 38, 39, 58, 59, 62 and 64.

The location of the ply turn-up ends 34a and 34b are an important aspect of the tire design. As is illustrated in FIG. 9, preferably the turn-up ends 34a, 34b are located radially outward a distance of between about 2 and 3 bead diameters from the intersection of a centerline 66 which extends through the center of bead wires 22, 24 and a line 67 which is tangent to the most radially inward surface of the carcass ply 34 where the carcass ply portions 34a, 34b loop around the wire beads 22, 24 to a line 68 which is perpendicular to centerline 66 and is tangent to the outer end of the ply layer 34. This location of the outer ends of the turn-up ends 34a, 34b of ply layer 34 is important in that it can with stand the pressure exerted against the ply end, which was sometimes sufficient to cause the ply end to break through the sidewall in prior art constructions where the turn-up ends extend closer to the center of the tire sidewalls. The advantage of having the outer ends of the turn-up ends 34a, 34b of carcass ply 34 at a lower position closer to the radial outward portion of the flange 35 is so that when operating conditions cause the ply end to break through the sidewall in prior art constructions where the turn-up ends extend closer to the center of the tire sidewalls. The advantage of having the outer ends of the turn-up ends 34a, 34b of carcass ply 34 at a lower position closer to the radial outward portion of the flange 35 is so that when operating conditions cause the tire to deflect outwards, the ends of turn-up ends 34a, 34b of the play layer 34 will be supported by flange 35. This arrangement will greatly reduce the possibility that the outer ends of turn-up ends 34a, 34b will be the cause of a crack in or penetrate axially outward through the sidewall of the tire 14.

The ply line of ply layer 34 follows the natural ply line, which means it is already at its natural shape upon inflation. The carcass ply 34 retains its natural shape when inflated to reduce the inflation strain on the tire. The portion of the ply cord extending down to the beads 22 is equally supported along its length by the axially interior surface 37 of the rim flange 35 which is substantially parallel to the centerline 66 passing though beads 22, 24.

Tread Belt

The tire 14 as illustrated does not require a tread or belt reinforcing structure because those components are provided in a removable tread belt 12 described below.

Figure 10:
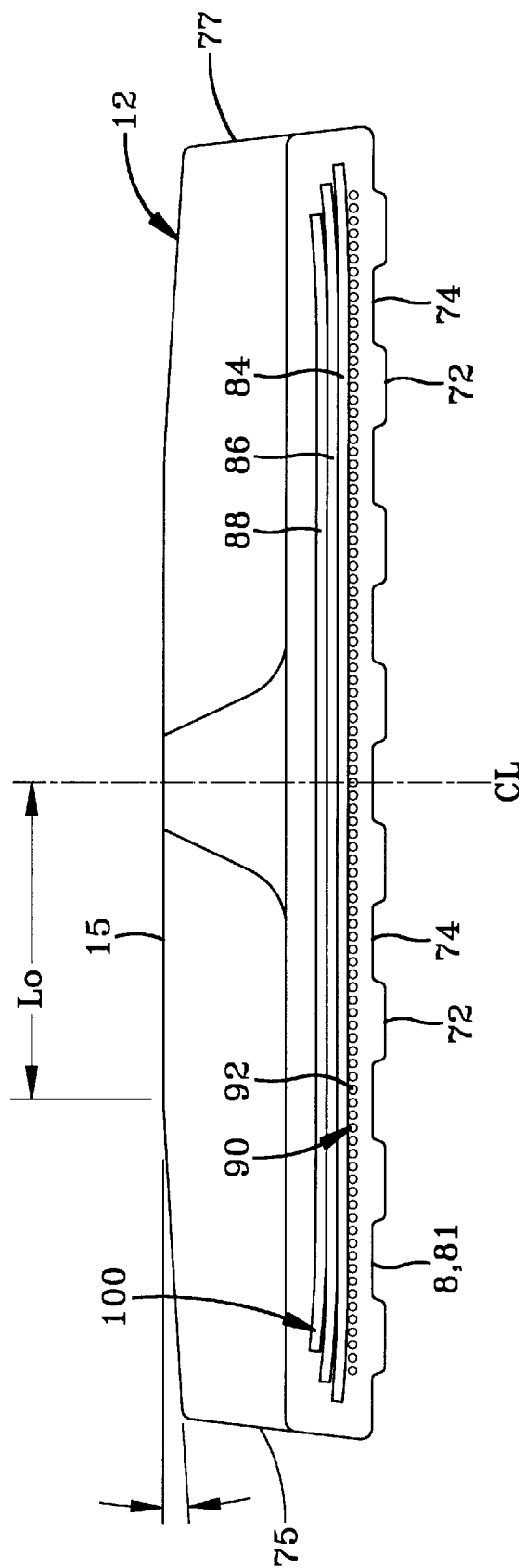
FIG. 10 is a cross-sectional view of a tread belt according to the embodiment shown in FIG. 2.

The ground engaging, circumferentially extending tread belts 12 are removably mounted on the pair of tires 14. As best shown in FIGS. 3 and 10, the underside or inner circumference surface 70 of tread belt 12 may have a plurality of annular ribs 72 and grooves 74 that mate with ribs 76 and grooves 78 of one or both tire 14 to restrain belt 12 from lateral or axial movement with respect to the tires 14.

As shown in FIG. 10, the tire tread belt 12 includes a tread portion 15 and a belt reinforcing structure 100 having a plurality of tread belts 84, 86, and 88. A radially inner belt layer 84 and 86 have cords of steel having a core strand surrounded by sheath strands. The core strand preferably has a plurality of three filaments forming the core. The wire construction is as described in co-pending application Ser. No. 09/507,316, filed Feb. 18, 2000, entitled STEEL CORD FOR REINFORCING ELASTOMERIC ARTICLES, which is incorporated by reference herein in its entirety. Each tread belt layer 84, 86 have the cords oriented at an angle of 15° to 80° relative to the circumferential direction and spaced at 4 ends per inch. These adjacent layers 84, 86 being equal but oppositely oriented.

The radially outermost third layer 88 has the steel cords oriented at 90° relative to the circumferential direction. This in combination with the belt layers 84, 86 create a very strong construction. Radially inward of these belt reinforcement layers is a unique first reinforcement layer 90 having cords 92 oriented 0° relative to the circumferential direction, preferably spaced at 3 EPI, all of these layers 84, 86, 88 and 90 forming the structure 100.

While three tread belts layers 84–88 is illustrated, it is within the scope of the invention to use other numbers of tread belt layers as needed. The combination of a removable tread belt 12 with a pair of tires 14 for use the large earthmoving vehicles is important in that it enables a portion of a three piece tire assembly 10 to be replaced instead of the entire two tires in the event the tires are fully worn, i.e., the tire belt 12 of one of the tires 14, wears out before the other parts. Also, it may be desirable to have different types of tread designs such as, for example, driving or steering tread designs. This feature allows for a less expensive means of changing the tire tread to construct the appropriate style of desired tire. This feature greatly reduces the cost of storing spare tires and could even extend the operating time of the tires.

A unique aspect of the present invention is the provision of zero degree wires 92 in the first reinforcement layer 90. The zero degree wires in layer 90 encircle the tire tread belt 12 and are provided to restrict the radially outward growth of the tread belt 12 which otherwise could occur due to a serious deflection in the tire carcass. By keeping the tire tread belt 12 from expanding radially outward, the tire's tread will maintain a more flat tread profile, which will improve the tread life and durability. The zero degree 92 wires in first reinforcement layer 90 eliminates the need for a larger number of belt layers.

With particular reference to the first reinforcement layer 90 it is believed most beneficial to have the axially outermost cords 92 axially inward of the lateral ends of the belt layers 84 and 86. As shown the lateral ends of the belt layer 84 overhangs the adjacent first reinforcement layer 90 and project axially outward from the lateral ends of belt layer 86. By insuring the belt layers 84 and 86 overhang or extend beyond the zero degree cords 92 of the first reinforcement layer 90 provides added protection against cut damage of the cords 92. As can be easily appreciated as a large sharp rock is rolled over in the path of the tread belt, the lateral ends of the tread belt can deflect and the belt layers 84, 86 by overhanging actually can bend over the zero degree cords 92 stopping the rock form cutting those cords.

The primary advantage of the tread belt design in the region of the lateral edges is the fact that the lateral edge portions of the tread belt 12 at the surface adjoining the circumferentially outer surface of the carcass 14 extend beyond the carcass 14 as shown at the interface 20 of the tread belt 12 and the carcass 14. This increases the flexibility of the tread belt 12 and improves the handling characteristics of the tire 10. The outer surface of the tread has an inclination of θ, θ being about 4° slope in the lateral portions of the tread and is flat or 0° sloped in the central region. The flat shaped central region extends at least 50% of the total tread width. In the 31.00R51 design, the central portion extends over 24.00 inches and each lateral portion extends from the central portion 25% or less of the total tread width, or about 7.00 inches in the 31.00R51 tire size of the illustrated embodiment tire.

This transition of the tread surface in the region Lo from sloping flat 0° to a 4° radially inward slope creates a shoulder drop-off (D) of at least 10 mm. This feature lowers the tread belt 12 contact pressure in the lateral portions and this generally reduces the shoulder wear particularly in the steering wheel positions. An added benefit is noted that in the deflection of the lateral portion is enhanced by a reduction in the radial height of the tread created by the shoulder drop-off (D). This means that the thinner tread at the lateral ends is easier to deflect radially outwardly but almost paradoxically the amount of inward pressuring trying to deflect inwardly the tread edge is lowered by the sloping shoulder. In combination this insures that while the tread belt is deliberately made flexible at the lateral edge to accommodate large stones and rock, preferably, the entire central region of the tread has even footprint pressures at the crown wherein the tread is fully supported. Ideally, the footprint pressure at the shoulders of the tread is equal to, or slightly less than, the central region.

At the interface between the tires 14 and the tread belt 12 it is believed desirable that the tread belt 12 overhangs the inflated an unloaded tires by an amount of at least 15 mm or 2% of the combined tires width as measured at the interface 20. As the heavy duty dual assembly 10 is placed under normal load the tires 14 expands radially outwardly to a location almost aligned with the lateral end of the tread belt 12 at the lateral end of the axially outer or exterior sides of the pair of tires. It is believed less desirable to have the tires 14 at the tread belt 12 interface to be extending laterally outward of the tread belt 12. The subtle relative movement of the tread belt 12 to the tires 14 means that to insure the outer sides of the tires 14 are not exposed requires the tread belt 12 to actually overhang the tires 14 at the interface. While large amounts of overhang may be feasible it is considered inefficient to allow the tread belt 12 to extend beyond the maximum section width of the tires on the outside of each dual wheel assembly. This is true for several reasons, first being each 1 inch of axial tread belt width on large sized tires such as 31.00R51 tire weighs approximately 100 lbs., secondarily the tread thickness is about 5.00 inches or greater and the distance to a location of the maximum section width of the carcass is another 24 inches meaning the rocks and debris most likely to damage the tire 14 will strike at the tread belt interface. Rocks 30 inches or greater simply are too unlikely to be traversable in the quarry and therefore create no realistic threat to carcass damage, thirdly because the present invention has the lateral edges to be of reduced stiffness to facilitate some degree of deflection radially inwardly, too large of an unsupported overhang could lead to flexure fatigue in the first reinforcement layer 90 requiring stiffening of the tread belt as was done in the prior art patent U.S. Pat. No. 4,050,495.

Figure 11A:
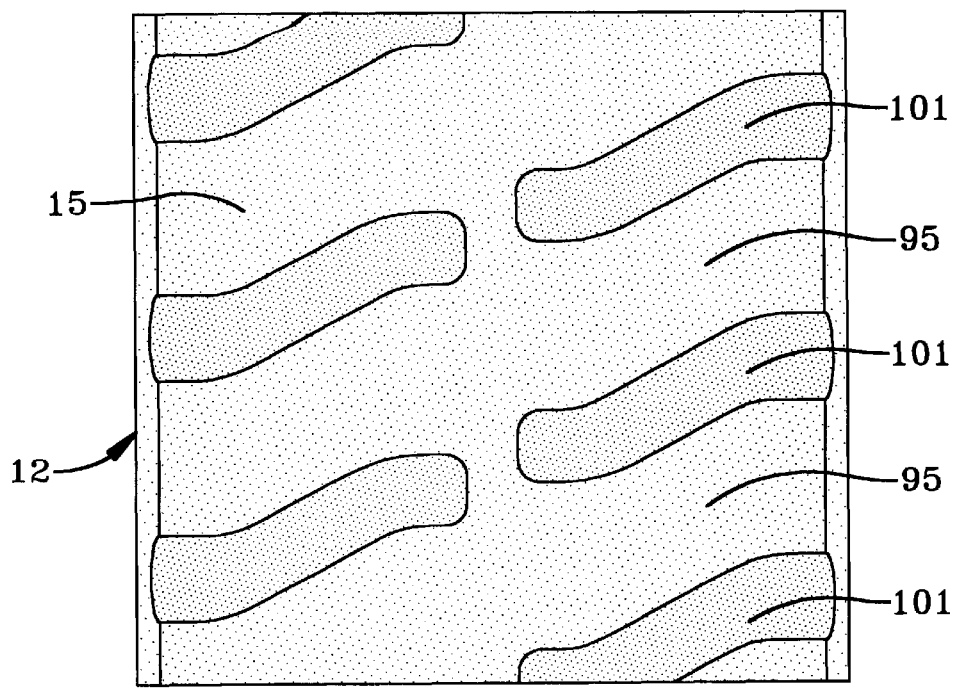
FIGS. 11A, 11B and 11C are portions of exemplary tread patterns for the tread belt.
Figure 11B:
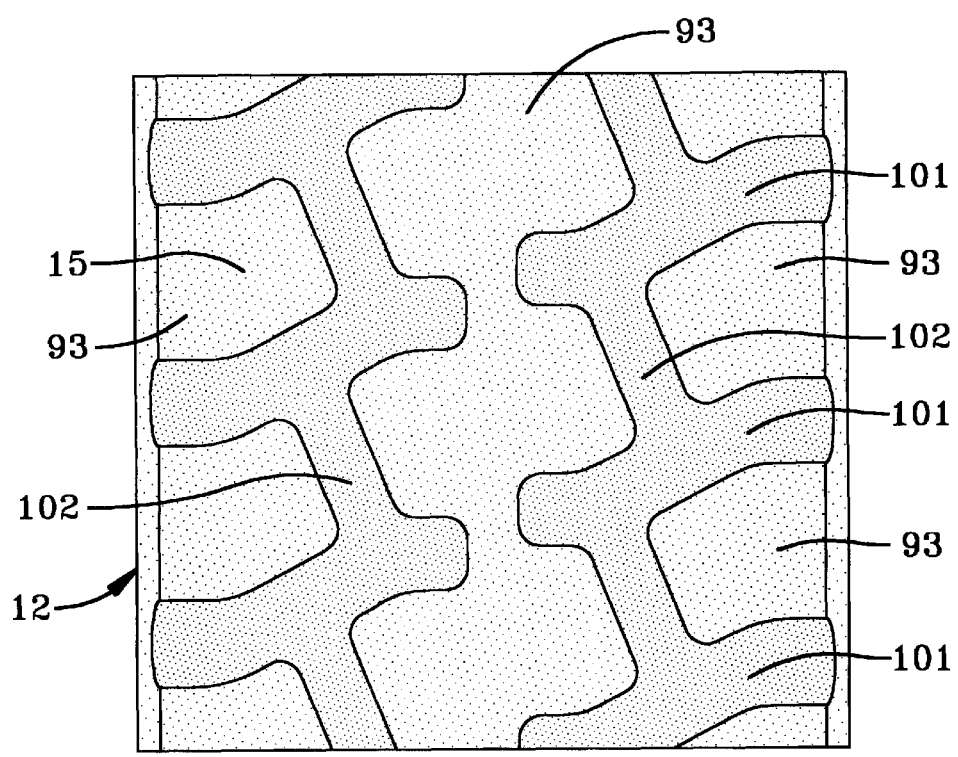
Figure 11C:
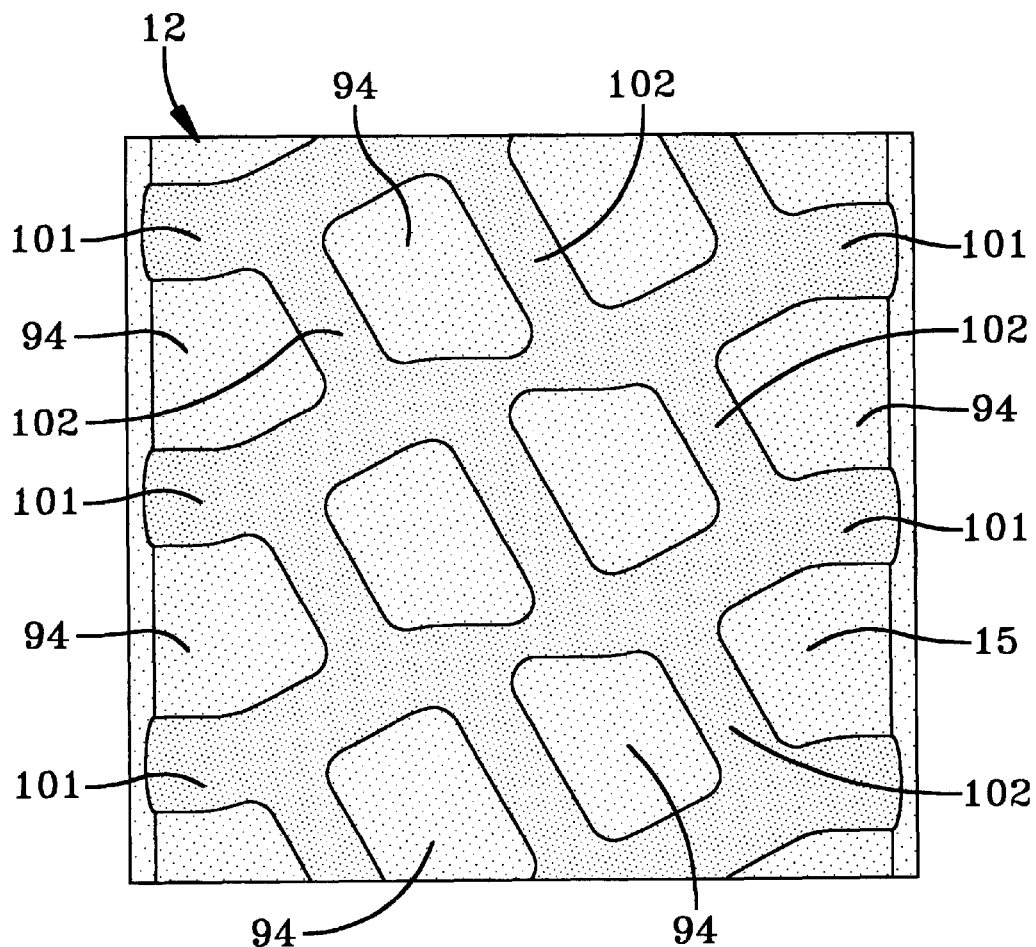

It is apparent that there has been provided in accordance with this invention apparatus and methods for constructing an improved heavy duty tire assembly 10 with a pair of removable tread belts 12 wherein the tire durability has been substantially increased. The improved tires and removable tread belts form a heavy duty assembly allowing large tires to be transported in several sections and then assembled at the delivery site. Further, the removable tread belt assembly allows a different tread belt 12 having alternative tread patterns as shown in FIGS. 11A, 11B and 11C (for exemplary purposes), to be applied to the pair of tires 14 so as to alter the driving characteristics of the tire assembly quickly and economically.

The heavy duty dual tire assembly 10 as described in the preceding pages is an example of one embodiment of a tire assembly having a pair of removable tread belts 12 and a pair of tires 14.

With reference to FIG. 1, the tire assembly 10 is shown in the perspective view. This tire assembly 10 shows the tread belts 12 having a radially outer tread 15 and internal of the tread belts 12 are two tires 14 which are encircled by the annular ring formed by the tread belts 12. As shown, the tires 14 are mounted on a dual rim 2. The tires 14 may employ a tread at the circumferentially outer surface having grooves 78 and ribs 76 that will assist in restraining the tire 14 and tread belt 12 from slippage either laterally or circumferentially. Additionally, these ribs 76 and the rib 8 of the tread belt 14 may be provided with sub passages 80 for convective air cooling maintaining both the tread belt 12 and the tire 14 in a cooling position preventing excessive heat buildup as illustrated in FIG. 5B of the tread belt 12.

Figure 2:
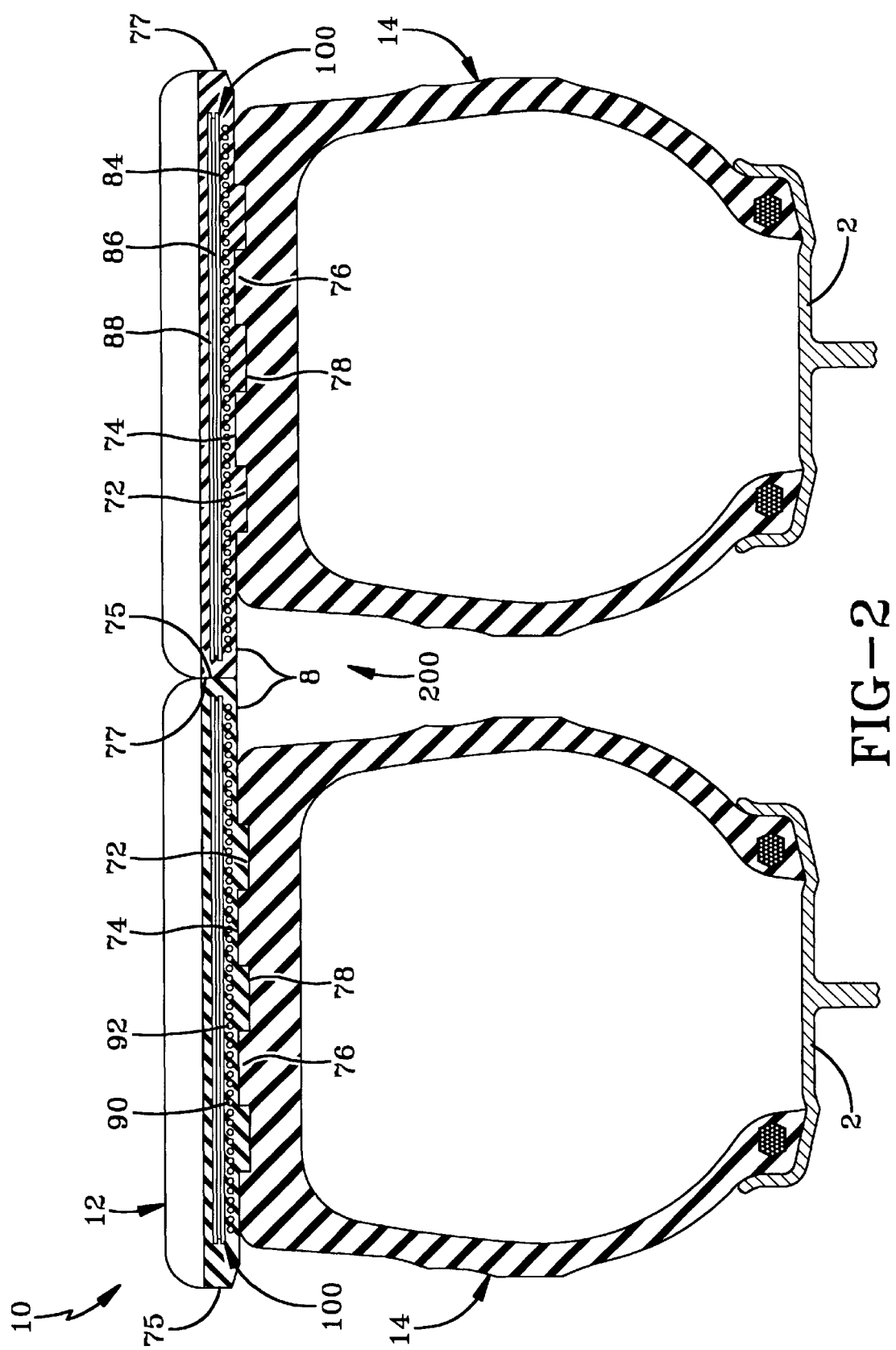
FIG. 2 is a cross-sectional view of a first embodiment of the invention.

With reference to FIG. 2, a cross-sectional view of the heavy duty dual tire assembly 10 is shown. The two tires 14 are shown mounted on a dual rim assembly 2 radially outward of the two tires 14 and encircling the tires 14 is the pair of tread belt assemblies 12. Located approximately mid-way between the two tires 14 the pair of tread belts 12 are shown abutting along the lateral edges 75, 77 of the tread belts 12. This abutting along the interior lateral edges 75, 77 of the dual tire assembly 10 prevents the tread belts 12 from deflecting radially inwardly and also provides additional circumferential slippage resistance. As shown, surface of the lateral edges 75, 77 of the tread belt 12 can be smooth or axially aligned, which increases the contact area with the lateral surface 75, 77 of the other tread belt 12. Once the first tire 14 and the tread belt 12 are mounted, the second tire 14 and tread belt 12 can then be mounted onto and shoved up against the lateral surface 77 of first tread belt 12 completing the tire assembly 10 in a rather simple and straightforward fashion. It must be appreciated that these tread belts 12 can come in sizes in excess often foot in diameter and weigh several tons. Therefore, a simple means for assembling the tread belts 12 and tires 14 on the very large earthmover vehicles is desirable.

Figure 4:
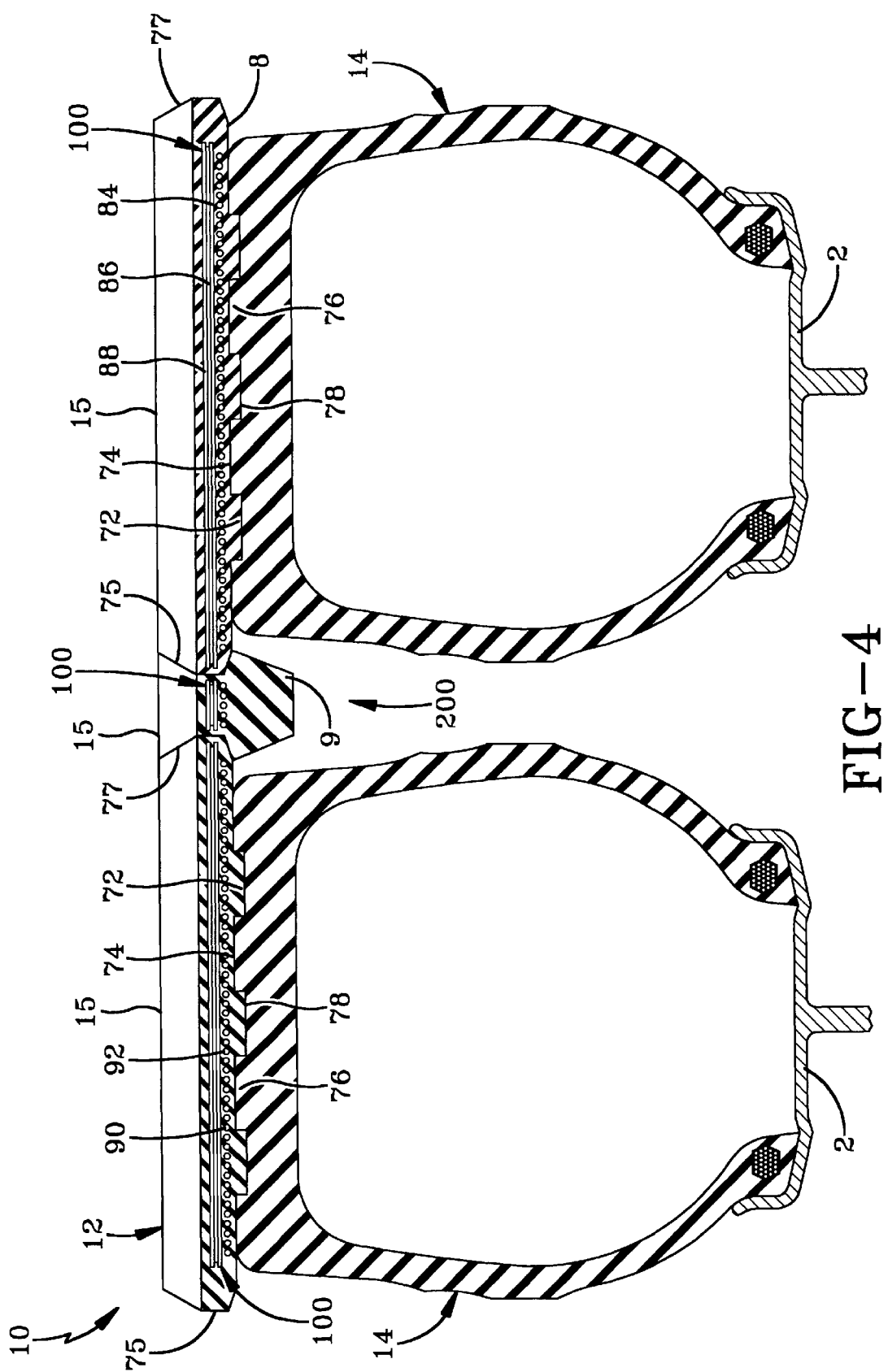
FIG. 4 is a cross-sectional view of a third embodiment of the invention.

With reference to FIGS. 2 through 4, in each embodiment shown the restraining means for the tread belts 12 are provided by a series of circumferentially continuous grooves 74 or ribs 72 which can interlock with the grooves 78 and ribs 76 shown on both of the tires 14. It must be appreciated that the tread belt 12 is simply laterally restrained by these grooves 74, 78 and ribs 72, 76 thereby keeping the tread belt 12 from slipping off of the tires 14. It has been determined circumferential restraining of the tread belt 12 and tires 14 is not necessary due to the maximum amount of surface contact at the inner surface 8 between the tires 14 and the tread belt 12. Nevertheless, it is feasible to provide such interlocking features to prevent circumferential torque from causing any slippage.

In the alternative embodiment of FIG. 3, the lateral edges of the tread belts 12 are shown having interlocking ribs extending radially outwardly along the abutting lateral edges 75, 77. These interlocking ribs 71 can be provided on each lateral surface of the tread belts 12 for symmetry and simplified mold manufacturing. These interlocking ribs increase the surface area of the abutted tread belts and therefore provide increased deflection stiffness.

In each of the embodiments of figures two and three the abutted tread belts 12 although being radially unsupported in the gap 200 between the two tires 14 are actually not cantilevered in such a way to permit excessive deflections. This is true because the abutting lateral 75 or 77 surface of the opposite tread belt 12 creates a compressive force as one tread belt 12 tries to deflect the opposite tread belt 12 presses against the deflecting tread belt restraining the deflection. In fact, the abutting tread belts 12 act as though they are a beam supported at both ends by the two tires. This novel way of supporting an independent and otherwise unsupported beam was a critical feature in bridge construction and in arches generally wherein the other members of the arch support the load by being in contact with adjacent pieces of the arch.

This is an important concept in this type of dual tire assembly 10. As shown the tread belts 12 are abutted. In fact, small gaps can be tolerated between the tread belts 12 along the adjacent lateral edges. The reason gaps are permitted is the tread belts 12 as they roll into the tires footprint actually radially compress the tread rubber, which effectively closes the tread gap distance. Secondarily, the radial deflection under a load on one or both belts slightly bends the tread belts at the lateral edge causing an abutting contact to occur. Accordingly, when the present invention describes the opposing tread belt 12 as being abutted it means that under deflected load in the tires footprint the tread belts should come into supporting contact to prevent excessive radially inward deflection. Otherwise the tread belts 12 can actually be slightly gapped when the wheels are unloaded or out of the tire's footprint.

As shown in FIG. 4, another embodiment of the invention is shown wherein the assembly 10 is provided with a central circumferentially continuous tread belt spacer 9 interposed between the tread belts 12 and the two tires 14, the tread belt spacer 9 is positioned between the two tires 14 and is a separate piece that may be formed in an annular shape such that it can lock onto the adjacent lateral edges 75, 77 of the tread belts 12. Once the tires 14 are mounted and inflated, the compressive forces between the tires 14 and the tread belt 12 lock the spacer 9 in such that lateral movement of the tread belt 12 is prevented.

As illustrated the spacer 9 can be a circumferentially continuous ring having an outer tread 15 and a reinforcing belt structure 100 similar to that described in the tread belts 12. Several belt layers 84, 86, 88 and a zero degree restrictor layer 90 are shown radially inward of the belt reinforcing structure is a radially inner rubber portion. The tread belts as shown have symmetrical amounts of overhang sufficiently large enough to permit the spacer 9 to interlock with both adjacent lateral edges of the two tread belts 12. The spacer 9 effectively spans the gap between the dual mounted tires.

As in the previously described embodiments, the spacer 9 in combination with the two tread belts 12 provides a means to limit the radial inward deflection of the tread belts in the central region of the assembly 10. In this embodiment, the tread belts 12 are symmetrically mounted over the tires 14 and the amount of overhang is identical on both sides of the tires. The spacer 9 simply occupies the gap.

In each of the embodiments shown, the central portion of the dual tire assembly is covered by a tread belt 12 and a spacer 9. As shown these features prevent the entry of large stones or other debris, which can become lodged between the tires.

Prior to the present invention massive steel rods known as "stone and rock ejectors" were rigidly mounted to the frame of the vehicle and located between the tires to pry the stones loose to prevent them from becoming permanently lodged between the tires. The present invention eliminates the need for such structures as no space is provided for rocks to become captured between the tires.

Figure 5A:
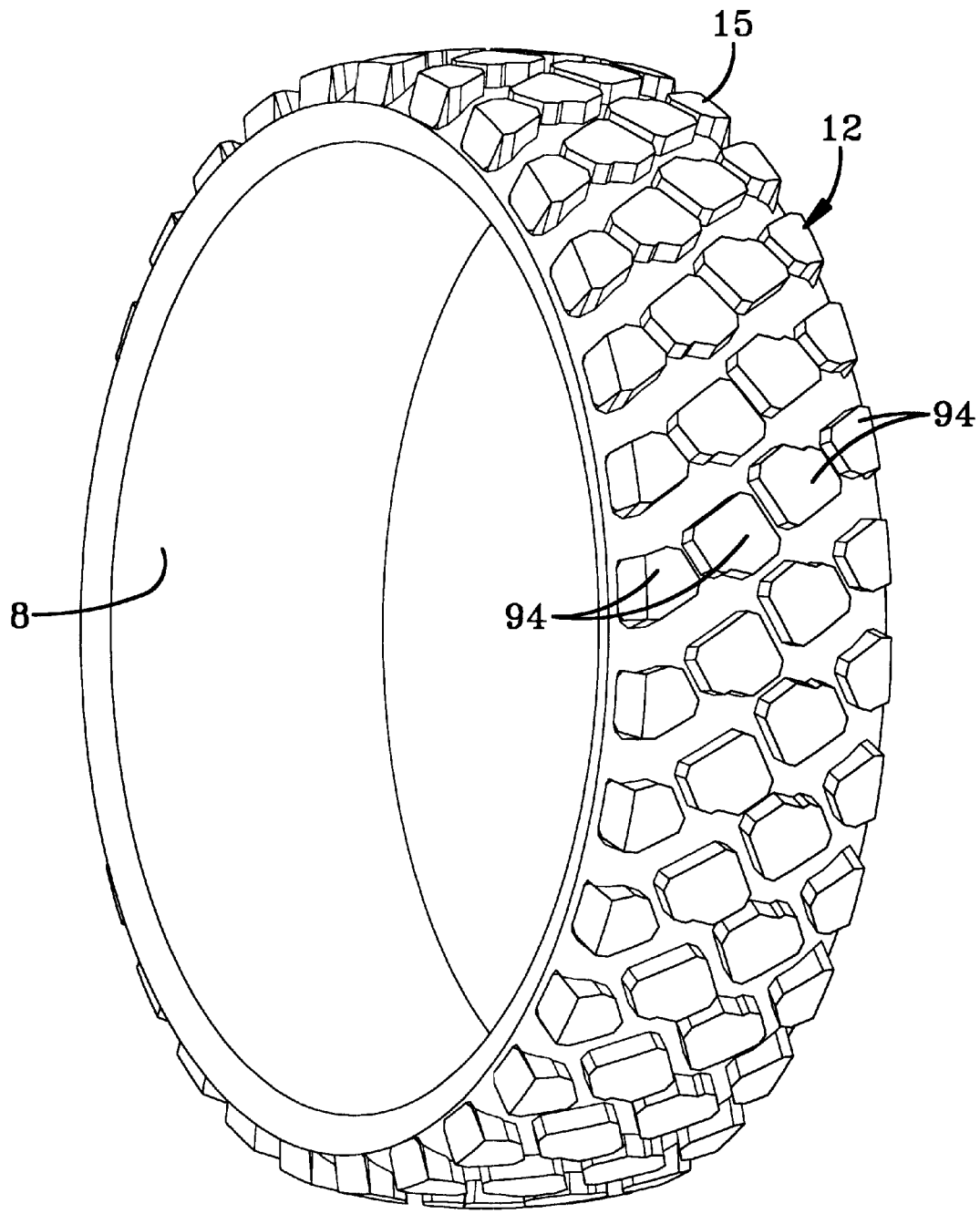
FIGS. 5A, 5B and 5C are perspective views of the removable tread belts formed in an annular ring.
Figure 5B:
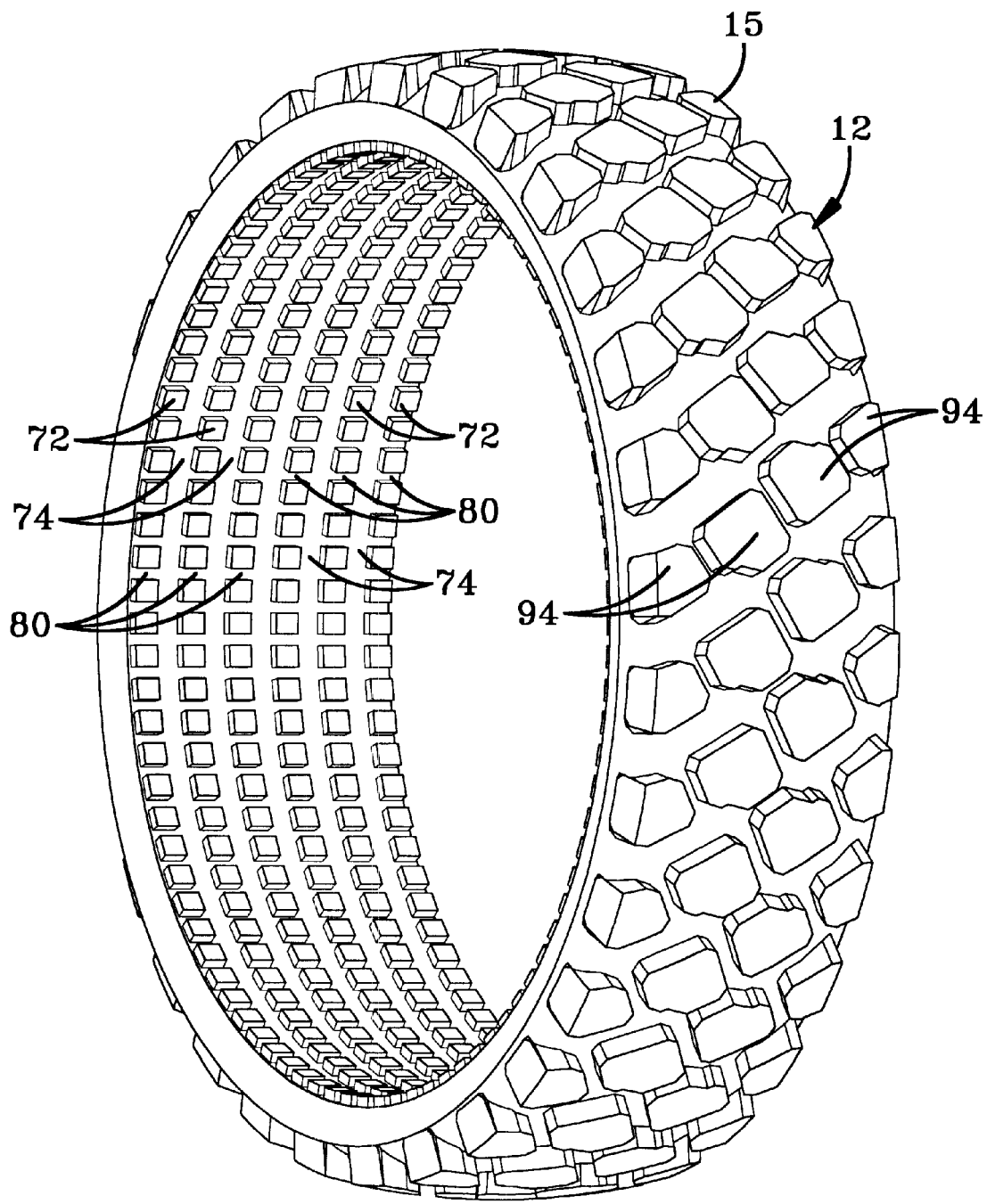
Figure 5C:
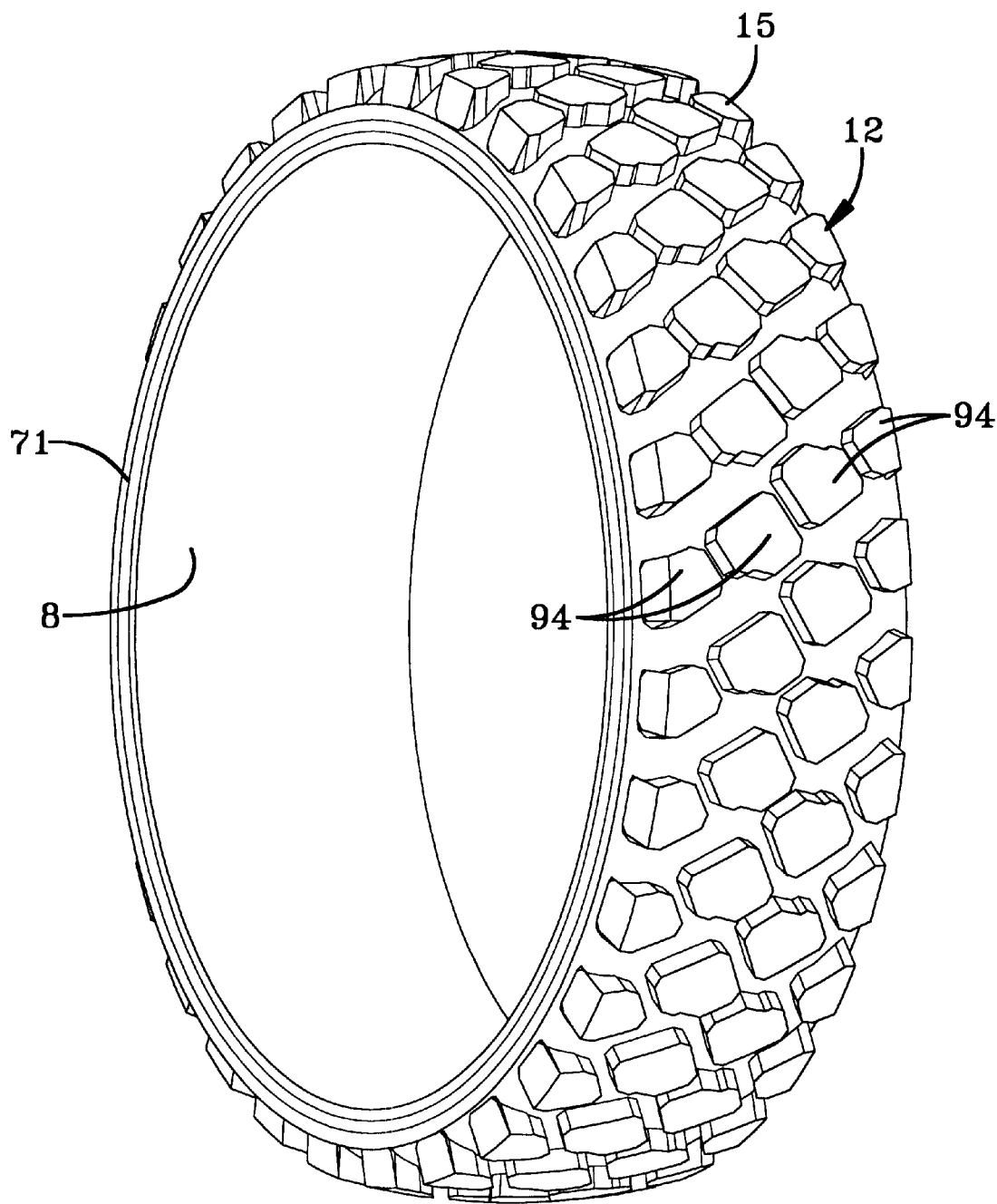

With reference to FIGS. 5A, 5B and 5C perspective views of the tread belts 12 are shown where the tread belt 12 is formed as an annular ring. FIG. 5B shows the internal interlocking ribs 72 and grooves 74 while in FIGS. 5A and 5C the internal surface 8 is shown smooth. It is understood that the tread belt 12 can also be provided as a flat track 12A with ends 11, 13 as illustrated in FIG. 6. In such as case it is preferable that the circumferentially extending reinforcing structure 100 should be wrapped around tubular reinforcement 110 at the ends 11, 13. Thus when the dual tires 14 are driven up over the track and then the track 12 is mounted over the dual tires 14 and by deflating the tires 14, the ends 11,13 can be joined together and pinned accordingly to rigidly fastened the ends, the tires 14 can be inflated tensioning the tread belt reinforcing structure 100 and ensuring that no circumferential or lateral slip occurs. When the removable tread belt assembly is provided as a flat track 12A, it can be appreciated that the assembly is greatly facilitated and that the components are more suitable for shipment when compared to the large annular tread belts 12.

In each embodiment it should be appreciated that in any dual wheel assembly a variety of tread patterns can be provided, many of which will be more suitable for off-road applications or heavy snow applications as is seen in the mountains during winter season. Typical examples are shown in FIGS. 11A, 11B and 11C. It is believed that these removable tread belts 12 provide a superior surface when compared to chains in these applications. Furthermore, these removable tread belts 12 can be driven on a hard paved surface without experiencing damage where on the other hand, chains are limited to use only in the most severe weather conditions. As shown in FIG. 11A, the tread 15 can have long lugs 95 spaced by grooves 101. Another pattern illustrated in FIG. 11B shows three rows of blocks 93 spaced by lateral grooves 101 and circumferential grooves 102. The tread pattern 15 may be four rows of blocks 94 spaced by grooves 101, 102 as shown in FIG. 11C.

Another benefit of the tire assembly 10 as illustrated is that the tires 14 underlying and encircled by the tread belts 12 see very little damage from obstructions and debris on both the on road and off road applications and it is therefore believed that this removable tread belt 12 which creates a far superior system for running tires in a dual wheel application. It is easily appreciated by those skilled in the art and those users of such tire that the tread belt assembly when worn can easily be retreaded making these tires 10 a more economical assembly. It is further believed that the tires 14 as described in the present invention can survive multiple tread belts 12 thus reducing substantially the cost of operating such tires.

In many parts of the world, dual tires have been replaced with very large, low aspect ratio single tires in an attempt to reduce cost by eliminating multiple rims and by providing only one tire carcass structure. In Europe for example, super single tires have been contemplated to replace dual tire applications on large 18 wheeled vehicles. A significant draw back of this type of tire is that it is preferable that a safety shield or inner tire be placed inside the super single tire and it is to be load supporting in the event that there should be a flat tire. The tires 14 of the present invention both carry load and are capable of carrying these loads when one tire is deflated. Secondarily, due to the rigid structure of the belt assemblies 12 it is believed that less structural fatigue would be occurring on the tire 14 that is running deflated. This is a common problem experienced in dual wheel application when one tire deflates, that tire is operated in an under deflated mode while still being subjected to continual flexing. With the present invention, it is believed that much of this load is absorbed by the tread belt 12, which is still supported by a fully inflated tire 14.

As shown, both tires 14 encircled by the tread belts 12 are of the same outside diameter. This greatly improves the safety of this type of tire assembly in this application and prevents the need for an inner safety tire.

What is readily apparent to those skilled in the art is the tire assembly of the present invention provides a safer system in that, should one tire be punctured or rapid depressurized, the other tire will maintain inflation and the tread belt assembly by being restrained as illustrated in the above description will maintain traction such that the driver will be able to control the vehicle.

It is believed preferable that of these tires be used in conjunction with internal pressure monitoring systems that will alert a driver to any sudden loss of pressure so that he can adjust his vehicles speed and/or operation conditions to ensure his own safety and those of others on the highway. While the present invention was described for heavy applications such as earthmover, it is readily apparent that the removable tread belt assembly 12 when mounted on dual tires 14 is suitable in any application where dual tires are considered desirable. These include but are not limited to farm tires used on tractors, trailer tires used on semi-trucks and 18-wheeled vehicles, drive axle as such vehicles in trailers.

What is claimed is:

1. A dual tire assembly comprises:

a pair of tires, the pair of tires being axially spaced when mounted on dual rims; and a pair of removable tread belts, the pair of tread belts encircling both tires and each tread belt abutting the other tread belt along lateral edge surfaces of each tread belt in the tire's footprint while under load.

2. The dual tire assembly of claim 1 wherein the pair of tires is coaxially aligned when mounted on rims.

3. The dual tire assembly of claim 1 wherein the tires are radially expandable.

4. The dual tire assembly of claim 3 wherein the tires are pneumatic.

5. The dual tire assembly of claim 1 wherein the removable tread belt is a circular elastomeric cord reinforced ring.

6. The dual tire assembly of claim 1 wherein the removable tread belt is a flat track having ends, the end when joined form a circular elastomeric cord reinforced ring.

7. The dual tire assembly of claim 1 wherein each tread belt has an inner surface, the inner surface has one or more radially inwardly projecting restraining elements laterally in contact with one tire.

8. The dual tire assembly of claim 7 wherein one or more restraining elements are a plurality of grooves and tread elements and wherein one of the tires has a tread having tread elements and grooves that interlock with the restraining elements of the tread belt.

9. A dual tire assembly comprises:

a pair of tires, the pair of tires being axially spaced when mounted on dual rims;

a pair of removable tread belts, the pair of tread belts encircling both tires and having lateral surfaces overhanging the tires; and an annular tread belt spacer as a separate component positioned between the two tread belts abutting against the lateral surfaces of both tread belts between the axially spaced tires.

10. The dual tire assembly of claim 9 wherein the annular tread belt spacer has an outer tread, a belt reinforcing structure and radially inner portion located between the two axially spaced tires.

* * * * *